(12) United States Patent
Zhao

(10) Patent No.: US 11,954,576 B2
(45) Date of Patent: Apr. 9, 2024

(54) METHOD FOR IMPLEMENTING AND DEVELOPING NETWORK MODEL AND RELATED PRODUCT

(71) Applicant: Shenzhen Corerain Technologies Co., Ltd., Shenzhen (CN)

(72) Inventor: Ruizhe Zhao, Shenzhen (CN)

(73) Assignee: Shenzhen Corerain Technologies Co., Ltd., Shenzhen (CN)

( * ) Notice: Subject to any disclaimer, the term of this patent is extended or adjusted under 35 U.S.C. 154(b) by 861 days.

(21) Appl. No.: 17/044,487

(22) PCT Filed: Apr. 17, 2018

(86) PCT No.: PCT/CN2018/083433
§ 371 (c)(1),
(2) Date: Oct. 1, 2020

(87) PCT Pub. No.: WO2019/200544
PCT Pub. Date: Oct. 24, 2019

(65) Prior Publication Data
US 2021/0042602 A1   Feb. 11, 2021

(51) Int. Cl.
*G06N 3/08* (2023.01)
*G06F 8/34* (2018.01)
(Continued)

(52) U.S. Cl.
CPC ............ *G06N 3/04* (2013.01); *G06F 8/34* (2013.01); *G06F 8/41* (2013.01); *G06N 3/08* (2013.01); *G06N 3/10* (2013.01)

(58) Field of Classification Search
None
See application file for complete search history.

(56) References Cited

U.S. PATENT DOCUMENTS 5,812,992 A     9/1998  de Vries
10,095,976 B1 * 10/2018  Hoffmann ......... G06F 16/90344
(Continued)

FOREIGN PATENT DOCUMENTS

CN       1578968 A       2/2005
CN       104685516       6/2015
(Continued)

OTHER PUBLICATIONS

Office Action in related CN201880003164.6 dated Apr. 1, 2022.
(Continued)

*Primary Examiner* — Ryan Barrett

(57) ABSTRACT

Disclosed are a method for implementing and developing a network model and a related product. The method includes: an establishment command of a neural network model is received, and a computation graph of an initial neural network model is established accordingly; a computing module selected and a connection relationship of the computing module are acquired, the computing module and the connection relationship are added into the computation graph of the initial neural network model, and an intermediate neural network model is obtained; and an establishment ending command of the neural network model is collected, the intermediate neural network model is verified according to the ending command to determine whether the computing module conflicts with other computing modules or not; if not, an established neural network model matched with a computation graph of the intermediate network model is generated, and execution codes matched with the computation graph are generated.

6 Claims, 2 Drawing Sheets

Receive an establishment command of a neural network model, and establish a computation graph of an initial neural network model according to the establishment command — S101

Acquire a computing module selected by the user and a connection relationship of the computing module, add the computing module and the connection relationship into the computation graph of the initial neural network model, and obtain an intermediate neural network model — S102

Collect an establishment ending command of the neural network model, verify the intermediate neural network model according to the ending command to determine whether the computing module conflicts with other computing modules or not; if not, generate an established neural network model matched with a computation graph of the intermediate network model, and generate execution codes matched with the computation graph — S103

(51) Int. Cl.
*G06F 8/41* (2018.01)
*G06N 3/04* (2023.01)
*G06N 3/10* (2006.01)

(56) References Cited

U.S. PATENT DOCUMENTS

| | | | |
|---|---|---|---|
| 10,726,507 B1* | 7/2020 | Thouzeau | G06T 11/206 |
| 11,205,236 B1* | 12/2021 | Smith | G06N 3/08 |
| 2007/0094168 A1* | 4/2007 | Ayala | G06N 3/105 |
| | | | 706/15 |
| 2016/0085971 A1 | 3/2016 | Saxena et al. | |
| 2017/0132513 A1 | 5/2017 | Yu et al. | |
| 2017/0293836 A1 | 10/2017 | Li et al. | |
| 2017/0323199 A1 | 11/2017 | Wu | |
| 2018/0018358 A1* | 1/2018 | Birdwell | G06N 3/086 |
| 2018/0075508 A1 | 3/2018 | Hewavitharana et al. | |
| 2018/0165574 A1* | 6/2018 | Young | G06F 17/16 |

FOREIGN PATENT DOCUMENTS

| | | |
|---|---|---|
| CN | 107016175 | 8/2017 |
| CN | 107239315 | 10/2017 |
| CN | 107346326 | 11/2017 |
| CN | 107480194 | 12/2017 |
| CN | 107563417 | 1/2018 |
| CN | 107766940 A | 3/2018 |
| CN | 107832837 | 3/2018 |
| CN | 107862058 | 3/2018 |

OTHER PUBLICATIONS

Office Action in related CN201880003164.6 dated Jul. 15, 2021.
International Search Report of PCT/CN2018/086433 dated Dec. 28, 2018.

* cited by examiner

METHOD FOR IMPLEMENTING AND DEVELOPING NETWORK MODEL AND RELATED PRODUCT

CROSS-REFERENCE TO RELATED APPLICATIONS

This is a National Stage Application, filed under 35 U.S.C. 371, of International Patent Application No. PCT/CN2019/083433 filed on Apr. 17, 2018, the content of which is incorporated herein by reference in its entirety.

TECHNICAL FIELD

The present application relates to the technical field of information processing, and particularly to a method for implementing and developing a network model and a related product.

BACKGROUND

With the continuous development of information technologies and the increasing demand of people, the requirement of people on the timeliness of information becomes higher and higher. Network models such as neural network models have been more and more widely applied along with the development of technologies. The training and operation performed on the network model may be realized for an apparatus such as a computer and a server; however, an existing neural network platform needs to be developed by professional developers. Thus the existing neural network platform is inconvenient for a user to use and has low universality, which affects the user experience.

SUMMARY

Embodiments of the present application provide a method for implementing and developing a network model and a related product.

In a first aspect, a method for implementing and developing a network model is provided. The method includes: an establishment command of a neural network model is received, and a computation graph of an initial neural network model is established according to the establishment command; a computing module selected by a user and a connection relationship of the computing module are acquired, the computing module and the connection relationship are added into the computation graph of the initial neural network model, and an intermediate neural network model is obtained; and an establishment ending command of the neural network model is collected, the intermediate neural network model is verified according to the ending command to determine whether the computing module conflicts with other computing modules or not; if not, an established neural network model matched with a computation graph of the intermediate network model is generated, and execution codes matched with the computation graph are generated.

In a second aspect, a platform for implementing and developing a network model is provided.

The platform for implementing and developing a network model includes a transceiving unit, an establishment unit and a processing unit. The transceiving unit is configured to receive an establishment command of a neural network model. The establishment unit is configured to establish a computation graph of an initial neural network model according to the establishment command. The transceiving unit is further configured to acquire a computing module selected by a user and a connection relationship of the computing module. The processing unit is configured to add the computing module and the connection relationship into the computation graph of the initial neural network model and obtain an intermediate neural network model. The transceiving unit is further configured to receive an establishment ending command of the neural network model. The processing unit is configured to verify the intermediate neural network model according to the ending command to determine whether the computing module conflicts with other computing modules or not; if not, to generate an established neural network model matched with a computation graph of the intermediate network model and generate execution codes matched with the computation graph.

In a third aspect, a computer-readable storage medium is provided. The computer-readable storage medium stores a computer program for electronic data exchange. The computer program causes a computer to perform the method described in the first aspect.

In a fourth aspect, a computer program product is provided. The computer program product includes a non-transitory computer-readable storage medium storing a computer program, and the computer program is executable to enable a computer to perform the method described in the first aspect.

According to the technical scheme provided by the present application, after the network model is updated, a simulation operation is performed for the network model to obtain an output result, and then the output result is displayed, so that the user can determine whether the network model is suitable for a corresponding hardware structure or not according to this output result, and thus the user experience can be improved.

BRIEF DESCRIPTION OF DRAWINGS

In order to more clearly explain the technical schemes in embodiments of the present application, the drawings used for describing the embodiments will be briefly introduced below. Obviously, the drawings in the following description are some embodiments of the present application. For those of ordinary skill in the art, other drawings may also be obtained without creative labor according to these drawings.

DETAILED DESCRIPTION

Figure 1:
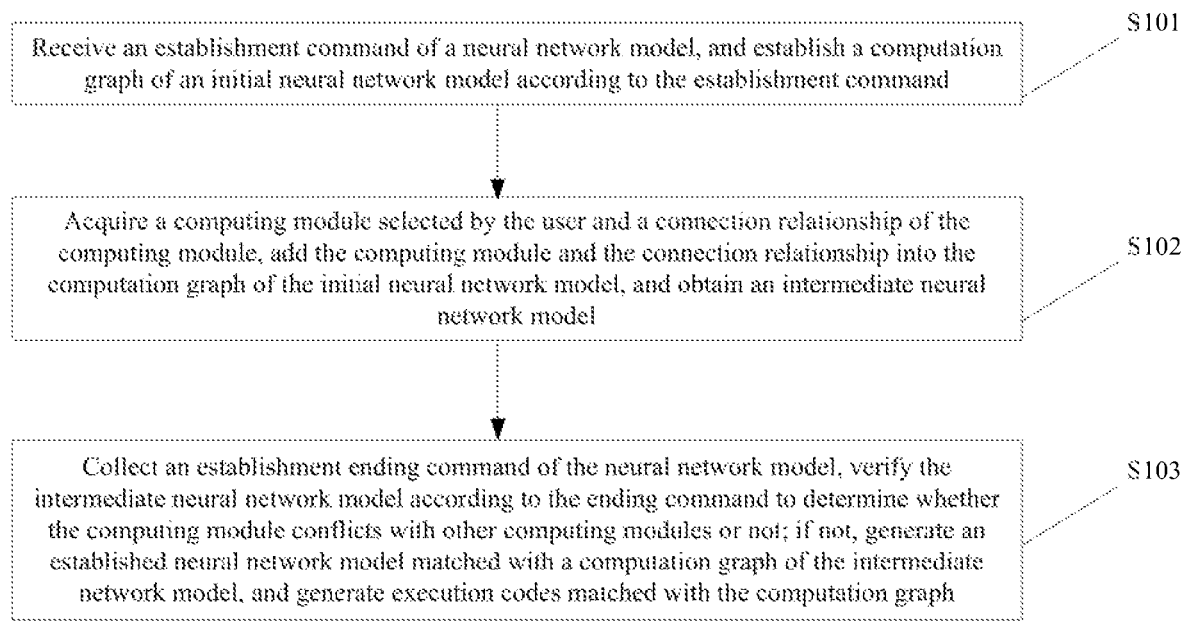
FIG. 1 is a flowchart of a method for implementing and developing a network model provided by an embodiment of the present application.

The technical schemes in embodiments of the present application will be described clearly and completely below in conjunction with the drawings in the embodiments of the present application. Apparently, the described embodiments are merely part of the embodiments of the present application, rather than all of the embodiments of the present application. All other embodiments obtained by those of ordinary skill in the art based on the embodiments of the present application without requiring creative efforts shall all fall within the scope of protection of the present application.

The terms "first", "second", "third", "fourth", etc., in the description, claims and drawings of the present application are used for distinguishing different objects, rather than describing a particular order. Furthermore, the terms "include" and "have", as well as any variations thereof, are intended to cover a non-exclusive inclusion. For example, a process, a method, a system, a product, or an apparatus that includes a series of steps or units is not limited to the given steps or units, but may further include steps or units not given, or may further include other steps or units inherent to such process, method, product, or apparatus.

Reference to "embodiment" herein means that a particular feature, structure, or characteristic described in conjunction with the embodiments may be included in at least one embodiment of the present application. The appearance of this word throughout the description does not necessarily all refer to the same embodiment, nor is it an independent or alternative embodiment mutually exclusive from other embodiments. Those skilled in the art understand, clearly and implicitly, that the embodiments described herein may be combined with other embodiments.

Since a mathematical method for simulating an actual neural network of a human comes out, people have been gradually habituated to directly refer to such artificial neural network as a neural network. The neural network has broad and attractive prospects in the fields of system identification, pattern recognition, intelligent control and the like. Especially in intelligent control, people are particularly interested in the self-learning function of the neural network, and this important characteristic of the neural network is regarded as one of keys for the adaptive capability of a controller in automatic control.

The neural network (NN) is a complex network system formed of a large number of simple processing units (referred to as neurons) which are widely connected to each other. The neural network reflects many basic features of the human brain function, and is a highly complex nonlinear power learning system. The neural network has capabilities of large-scale parallelism, distributed storage and processing, self-organization, self-adaptation, and self-learning, and is particularly suitable to overcome the inaccuracy and fuzziness in information processing that requires simultaneous consideration of many factors and conditions. The development of the neural network is related to neuroscience, mathematical science, cognitive science, computer science, artificial intelligence, information science, control theory, robotics, microelectronics, psychology, optical computation, molecular biology and the like, and is an emerging marginal interdiscipline.

The neural network is based on neurons.

A neuron is a biological model based on a nerve cell of a biological nervous system. When people study the biological nervous system and discuss the mechanism of artificial intelligence, the neuron is represented mathematically, and thus a mathematical model of the neuron is generated.

A large number of neurons of the same form are joined together to form the neural network. The neural network is a highly nonlinear dynamics system. Although the structure and function of each neuron are not complex, the dynamic behavior of the neural network is very complex; therefore, various phenomena in the actual physical world may be expressed by using the neural network.

A neural network model is described based on the mathematical model of the neuron. The artificial neural network is a description of the first order characteristics of a human brain system. Briefly, the artificial neural network is a mathematical model. The neural network model is represented by a network topology, node characteristics and a learning rule. The huge attraction of the neural network to people mainly includes parallel and distributed processing, high robustness and fault-tolerant capability, distributed storage and learning capability, and the capability of fully approximating a complex nonlinear relationship.

Among the research topics of the control field, the control of an uncertain system has been one of the central themes of the control theory research for a long time. The learning capability of the neural network enables the neural network to automatically learn the characteristics of the uncertain system in the process of controlling the system, so as to automatically adapt to the variation of the characteristics of the system along with time, and achieve the optimal control of the system; obviously, this is encouraging intention and method.

There are now dozens of models of the artificial neural network, among which BP neural network, Hopfield network, ART networks and Kohonen network are often used classical neural network models.

Reference is made to FIG. 1. FIG. 1 is a method for implementing and developing a network model provided by the present application. The method is implemented by a platform for implementing the network model. As shown in FIG. 1, the method includes steps described below.

In step S101, an establishment command of a neural network model is received, and a computation graph of an initial neural network model is established according to the establishment command.

The establishment command of the neural network model described above may be represented with an icon, and when a user clicks the icon, it is determined that the establishment command of the neural network model is received. Of course, in practical applications, the acquisition of the establishment command described above may also be realized in other ways.

In step S102, a computing module selected by the user and a connection relationship of the computing module are acquired, the computing module and the connection relationship are added into the computation graph of the initial neural network model, and an intermediate neural network model is obtained.

The foregoing manner of acquiring the computing module selected by the user may specifically include: the computing module selected by the user through a dragging function is acquired.

The foregoing manner of determining the connection relationship of the computing module may include: a function of the computing module is determined, all possible connection relationships are determined according to this function, and the all connection relationships are displayed to the user for selection. For example, in terms of one convolution computing module, an input end of the convolution computing module may be connected to an output end of a conversion module or output data of an upper layer, and an output end of the convolution computing module may be connected to an input end of an activation module or input data of a lower layer. Of course, the all connection relationships described above are merely for purposes of example, and the specific implementation manners of the present application does not limit a manner in which the above-described connection relationships are displayed or selected.

In step S103, an establishment ending command of the neural network model is collected, the intermediate neural network model is verified according to the ending command to determine whether the computing module conflicts with other computing modules or not; if not, an established neural network model matched with a computation graph of the intermediate network model is generated, and execution codes matched with the computation graph are generated.

According to the technical scheme provided by the present application, computing modules are represented graphically without professionals; in this way, the user only needs to select a required computing module from various graphical computing modules and then determine the connection relationship of the computing module, so as to implement the graphical establishment of the neural network model. This does not have high requirement on the professionalism of the user, and may be widely applied to the establishment of the neural network model.

According to the technical scheme provided by the present application, after the network model is updated, a simulation operation is performed for the network model to obtain an output result, and then the output result is displayed, so that the user can determine whether the network model is suitable for a corresponding hardware structure or not according to this output result, and thus the user experience can be improved.

In an embodiment, the method described above, after the step S103, may further includes: a training sample input by the user is received, a type of an established initial neural network model is determined, a mark mode and a mark example of the training sample are determined according to the type, the mark example is displayed, and the user is prompted to mark the training sample according to the mark mode to obtain a marked training sample.

According to the technical scheme, a marking function of the training sample is provided, which provides the user with the marking of an input training sample through the corresponding type of the mark mode and the mark example, and provides an execution base for a subsequent operation or training.

In an embodiment, the method described above, after marking, may further includes: the marked training sample as input data is input into the established neural network model for training to obtain a trained neural network model.

According to the technical scheme, a process of training the neural network model is provided, that is, weight data of the established neural network model may be trained through the platform to obtain a trained neural network model.

In an embodiment, the method described above, after marking, may further includes: the marked training sample as input data is input into the established neural network model to perform a forward operation to obtain a forward operation result, and the forward operation result is displayed.

According to the technical scheme, the computation of the input data is provided for the user, and the forward operation result is displayed, so that the user may compare the marked training sample with the computation result to determine whether the established neural network model is reasonable or not, and a direction and a thought are provided for the user to optimize the neural network model.

Figure 2:
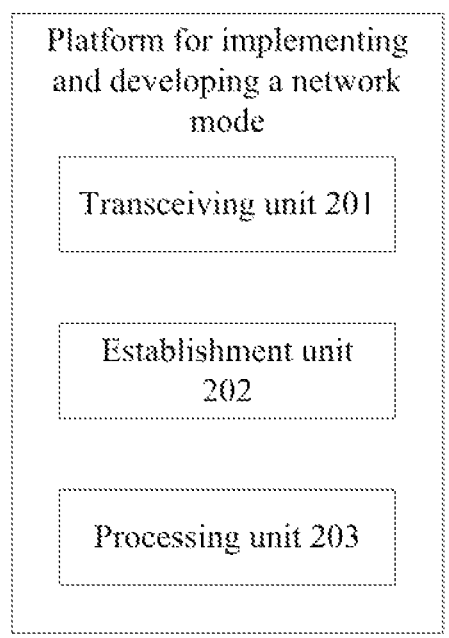
FIG. 2 is a structural diagram of a platform for implementing and developing a network model provided by an embodiment of the present application.

Reference is made to FIG. 2. FIG. 2 provides a platform for implementing and developing a network model. The platform for implementing and developing a network model includes a transceiving unit 201, an establishment unit 202 and a processing unit 203. The transceiving unit 201 is configured to receive an establishment command of a neural network model. The establishment unit 202 is configured to establish a computation graph of an initial neural network model according to the establishment command. The transceiving unit 201 is further configured to acquire a computing module selected by a user and a connection relationship of the computing module. The processing unit 203 is configured to add the computing module and the connection relationship into the computation graph of the initial neural network model and obtain an intermediate neural network model. The transceiving unit 201 is further configured to receive an establishment ending command of the neural network model. The processing unit 203 is configured to verify the intermediate neural network model according to the ending command to determine whether the computing module conflicts with other computing modules or not; if not, to generate an established neural network model matched with a computation graph of the intermediate network model and generate execution codes matched with the computation graph.

In an embodiment, the transceiving unit 201 is further configured to receive a training sample input by the user. The processing unit 203 is further configured to determine a type of an established initial neural network model, determine a mark mode and a mark example of the training sample according to the type, display the mark example, and prompt the user to mark the training sample according to the mark mode to obtain a marked training sample.

According to the technical scheme, a marking function of the training sample is provided, which provides the user with the marking of an input training sample through the corresponding type of the mark mode and the mark example, and provides an execution base for a subsequent operation or training.

In an embodiment, the processing unit 203 is further configured to input the marked training sample as input data into the established neural network model for training to obtain a trained neural network model.

The marked training sample is input as input data into the established neural network model for training to obtain the trained neural network model.

In an embodient, the processing unit 203 is further configured to input the marked training sample as input data into the established neural network model to perform a forward operation to obtain a forward operation result, and display the forward operation result.

According to the technical scheme, the computation of the input data is provided for the user, and the forward operation result is displayed, so that the user may compare the marked training sample with the computation result to determine whether the established neural network model is reasonable or not, and a direction and a thought are provided for the user to optimize the neural network model.

The present application further provides a computer-readable storage medium. The computer-readable storage medium stores a computer program for electronic data exchange. The computer program enables a computer to perform the method as shown in FIG. 1 and a detailed scheme of this method.

The present application further provides a computer program product. The computer program product includes a non-transitory computer-readable storage medium storing a computer program. The computer program is operable to enable a computer to perform as shown in FIG. 1 and a detailed scheme of this method.

It should be noted that for the foregoing method embodiments, for the sake of simple description, they are all expressed as a series of action combinations, but those skilled in the art should know that the present application is not limited by the described sequence of actions, since certain steps may be performed in other orders or concurrently in accordance with the present application. Secondly, those skilled in the art should also know that the embodiments described in the description are merely some embodiments, and that the actions and modules involved are not necessarily required by the present application.

In the embodiments described above, the description of various embodiments has emphasis on each. For parts that are not described in detail in certain embodiment, reference may be made to related descriptions of other embodiments.

In several embodiments provided in this application, it should be understood that the disclosed device may be implemented in other ways. For example, the device embodiments described above are merely illustrative, for example, the division of said unit is only a logical function division, and there may be additional ways of division in actual implementation, for example multiple units or assemblies may be combined or integrated into another system, or some features may be ignored, or not performed. In addition, the displayed or discussed mutual coupling or direct coupling or communication connection may be an indirect coupling or a communication connection through some interfaces, devices or units, and may be in electrical or other forms.

The units described as separate components may or may not be physically separated, and the components displayed as the unit may or may not be physical units, i.e., they may be located in one place or distributed across multiple network units. Part or all of the units may be selected according to practical requirements to achieve the purpose of the scheme of this embodiment.

In addition, each functional unit in each embodiment of the present application may be integrated into one processing unit, or each unit may exist independently and physically, or two or more units may be integrated into one unit. The integrated unit described above may be realized in the form of hardware or a software program module.

The integrated unit described above, if implemented in the form of a software program module and sold or used as a separate product, may be stored in a computer-readable memory. Based on such understanding, the technical scheme of the present application, either essentially or in terms of contributions to the related art, or all or part of the technical schemes, may be embodied in the form of a software product, and the computer software product is stored in a memory, the memory includes several instructions for enabling a computer apparatus (which may be a personal computer, a server, or a network apparatus, etc.) to perform all or part of the methods described in the various embodiments of the present application. However, the aforementioned memory includes various media capable of storing program codes, such as a USB flash disk, a read-only memory (ROM), a random access memory (RAM), a mobile hard disk, a magnetic disk or an optical disk.

It should be understood by those of ordinary skill in the art that all or part of the steps in the various methods of the above embodiments may be implemented by a program, which is stored in a computer-readable memory, the memory includes a flash memory disk, a read-only memory (referred to as ROM), a random access memory (referred to as RAM), a magnetic disk or an optical disk.

The embodiments of the present application are described in detail above, and specific examples are used herein to illustrate the principles and implementations of the present application. The description of the above embodiments is merely intended to help understand the method and core ideas of the present application; meanwhile, for a person skilled in the art, according to the idea of the present application, the specific implementation manner and the application scope may be changed, and in summary, the content of the present Description should not be construed as a limitation to the present application.

What is claimed is:

1. A method for implementing and developing a network model, performed by a computer apparatus, wherein the method comprising:
   receiving an establishment command of a neural network model in response to detecting a click on an icon from a user, and establishing a computation graph of an initial neural network model according to the establishment command;
   acquiring a computing module selected by a user and a connection relationship of the computing module selected by the user, adding the computing module and the connection relationship into the computation graph of the initial neural network model, and obtaining an intermediate neural network model; and
   collecting an establishment ending command of the neural network model, verifying the intermediate neural network model according to the establishment ending command to determine whether the computing module conflicts with other computing modules or not;
   determining that the computing module does not conflict with other computing modules, generating an established neural network model matched with a computation graph of the intermediate network model and generating execution codes matched with the computation graph of the intermediate neural network model;
   receiving a training sample input by the user, determining a type of the established initial neural network model, determining a mark mode and a mark example of the training sample according to the type, displaying the mark example, and prompting the user to mark the training sample according to the mark mode to obtain a marked training sample; and
   inputting the marked training sample as input data into the established neural network model for training to obtain a trained neural network model;
   wherein acquiring the computing module selected by the user and the connection relationship of the computing module selected by the user comprising:
   acquiring the computing module which is selected through a dragging function by the user; determining a function of the computing module; determining all possible connection relationships according to the function of the computing module; and displaying all connection relationships to the user for selection for determining the connection relationship of the computing module.

2. The method of claim 1, wherein the method further comprises:
   inputting the marked training sample as input data into the established neural network model to perform a forward operation to obtain a forward operation result, and displaying the forward operation result.

3. A platform for implementing and developing a network model, comprising:
   a processor; and
   a memory for storing instructions executable by the processor,
   wherein when executing the instructions, the processor is configured to:
   receive an establishment command of a neural network model in response to detecting a click on an icon from a user, and establish a computation graph of an initial neural network model according to the establishment command;

acquire a computing module selected by a user and a connection relationship of the computing module selected by a user, add the computing module and the connection relationship into the computation graph of the initial neural network model, and obtain an intermediate neural network model; and collect an establishment ending command of the neural network model, verify the intermediate neural network model according to the establishment ending command to determine whether the computing module conflicts with other computing modules or not; determine that the computing module does not conflict with other computing modules, generate an established neural network model matched with a computation graph of the intermediate network model and generate execution codes matched with the computation graph of the intermediate neural network model;

receive a training sample input by the user, determine a type of the established initial neural network model, determine a mark mode and a mark example of the training sample according to the type, display the mark example, and prompt the user to mark the training sample according to the mark mode to obtain a marked training sample;

input the marked training sample as input data into the established neural network model for training to obtain a trained neural network model; and when executing the instruction, the processor is further configured to:

acquire the computing module which is selected through a dragging function by the user; determine a function of the computing module; determine all possible connection relationships according to the function of the computing module; and display the all connection relationships to the user for selection for determining the connection relationship of the computing module.

4. The platform for implementing and developing a network mode of claim 3, wherein the processor is further configured to:

input the marked training sample as input data into the established neural network model to perform a forward operation to obtain a forward operation result, and display the forward operation result.

5. A non-transitory computer-readable storage medium, storing a computer program for electronic data exchange, wherein the computer program causes a computer to perform a method for implementing and developing a network model, wherein the method comprises:

receiving an establishment command of a neural network model in response to detecting a click on an icon from a user, and establishing a computation graph of an initial neural network model according to the establishment command;

acquiring a computing module selected by a user and a connection relationship of the computing module selected by the user, adding the computing module and the connection relationship into the computation graph of the initial neural network model, and obtaining an intermediate neural network model; and collecting an establishment ending command of the neural network model, verifying the intermediate neural network model according to the establishment ending command to determine whether the computing module conflicts with other computing modules or not;

determining that the computing module does not conflict with other computing modules, generating an established neural network model matched with a computation graph of the intermediate network model and generating execution codes matched with the computation graph of the intermediate neural network model;

receiving a training sample input by the user, determining a type of the established initial neural network model, determining a mark mode and a mark example of the training sample according to the type, displaying the mark example, and prompting the user to mark the training sample according to the mark mode to obtain a marked training sample; and inputting the marked training sample as input data into the established neural network model for training to obtain a trained neural network model;

wherein acquiring the computing module selected by the user and the connection relationship of the computing module selected by the user comprising:

acquiring the computing module which is selected through a dragging function by the user; determining a function of the computing module; determining all possible connection relationships according to the function of the computing module; and displaying the all connection relationships to the user for selection for determining the connection relationship of the computing module.

6. The non-transitory computer-readable storage medium of claim 5, wherein the method further comprises:

inputting the marked training sample as input data into the established neural network model to perform a forward operation to obtain a forward operation result, and displaying the forward operation result.

* * * * *